US011901603B2

(12) United States Patent
Wu et al.

(10) Patent No.: US 11,901,603 B2
(45) Date of Patent: Feb. 13, 2024

(54) COUPLED-LINE RAT-RACE COUPLER WITH SMOOTH IN-PHASE AND OUT-OF-PHASE PERFORMANCES

(71) Applicant: BEIJING UNIVERSITY OF POSTS AND TELECOMMUNICATIONS, Beijing (CN)

(72) Inventors: Yongle Wu, Beijing (CN); Yiwen Wei, Beijing (CN); Weimin Wang, Beijing (CN); Yuhao Yang, Beijing (CN); Yifan Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 437 days.

(21) Appl. No.: 17/347,532

(22) Filed: Jun. 14, 2021

(65) Prior Publication Data

US 2021/0391635 A1 Dec. 16, 2021

(30) Foreign Application Priority Data

Jun. 15, 2020 (CN) ......................... 202010543810.7

(51) Int. Cl.
*H01P 5/18* (2006.01)
*H01P 5/22* (2006.01)

(52) U.S. Cl.
CPC .............. *H01P 5/184* (2013.01); *H01P 5/185* (2013.01); *H01P 5/222* (2013.01)

(58) Field of Classification Search
CPC .......... H01P 5/184; H01P 5/185; H01P 5/227; H01P 5/222
USPC ......................... 333/116, 117–121, 204, 205
See application file for complete search history.

(56) References Cited

U.S. PATENT DOCUMENTS 7,323,955 B2 1/2008 Jachowski

FOREIGN PATENT DOCUMENTS

| | | | |
|---|---|---|---|
| CN | 1377100 | A | 10/2012 |
| CN | 102832435 | A | 12/2012 |
| CN | 104506209 | A | 4/2015 |
| CN | 109818127 | A | 5/2019 |

(Continued)

OTHER PUBLICATIONS

Wu et al., "A Novel Planar Impedance-Transforming Tight-Coupling Coupler and Its Applications to Microstrip Baluns", IEEE Transactions on Components, Packaging and Manufacturing Technology, 2014, vol. 4, No. 9,1480-1488.

*Primary Examiner* — Rakesh B Patel
(74) *Attorney, Agent, or Firm* — PAI PATENT & TRADEMARK LAW FIRM; Chao-Chang David Pai

(57) ABSTRACT

A coupled-line rat-race coupler includes four ports and four coupled-lines each composed of two metal lines. Two of the ports are respectively connected with the front ends of the two lines of the first coupled-line, and the other two ports are respectively connected with the front ends of the two lines of the second coupled-line. The two lines of the third coupled-line are short circuited and respectively connected with the back end of one line of the first coupled-line on one side and with the back end of one line of the second coupled-line on the other side. In the fourth coupled-line, one line is open at one end and short circuited at the other end with the other line, which is connected with one line of the first coupled-line and one line of the second coupled-line. The coupled-line rat-race coupler is characterized with smooth and stable output phase.

10 Claims, 7 Drawing Sheets

(56) References Cited

FOREIGN PATENT DOCUMENTS

| | | | |
|---|---|---|---|
| CN | 111029703 | A | 4/2020 |
| JP | S6489702 | A | 4/1989 |

COUPLED-LINE RAT-RACE COUPLER WITH SMOOTH IN-PHASE AND OUT-OF-PHASE PERFORMANCES

BACKGROUND OF THE INVENTION

Field of the Invention

The invention relates to the technical field of coupler, in particular to a coupled-line rat-race coupler with smooth in-phase and out-of-phase performances.

Description of the Prior Art

In communication systems, RF devices are indispensable devices, such as filters, power dividers, couplers and other devices. They are widely used in communication systems. The performance of RF devices will affect the performance of the equipment in the communication system, and then affect the quality of communication. Therefore, improving the performance of RF devices is the key to improving the performance of the whole communication system. The common four port coupler can divide one power signal into two ways, namely power distribution, or two power signals can be combined into one way, namely power combination. Couplers play an important role in balanced amplifier, phase shifter, antenna feeding system, mixer, power amplifier and other devices and systems.

The existing traditional rat-race coupler circuit structure is shown in FIG. 1. The four ports are connected by respective microstrip lines to a microstrip ring. The microstrip lines between port 1 and port 2, between port 1 and port 3, and between port 3 and port 4 each have an electric length of $\lambda/4$, whereas the microstrip line between port 2 and port 4 has an electric length of $3\lambda/4$, where $\lambda$ is the wavelength corresponding to the central frequency, which is 3.5 GHz. At the central frequency, the characteristic impedance of the microstrip ring is $\sqrt{2}Z_0$. The characteristic impedance of the microstrip line from each port to the microstrip ring is $Z_0$.

The performance of the traditional rat-race coupler is stable at the central frequency, but once the working frequency deviates from the central frequency, the electric length of the microstrip lines between the ports in the circuit structure of the rat-race coupler will change, which will lead to changes in the output phase of the rat-race coupler, and affect the stability of the output phase of the rat-race coupler.

BRIEF SUMMARY OF THE INVENTION

The purpose of the present invention is to provide a coupled-line rat-race coupler with smooth in-phase and out-of-phase performances, so as to improve the stability of the output phase of the rat-race coupler.

The coupled-line rat-race coupler according to the present invention includes four ports: first port, second port, third port and fourth port; and four coupled-lines: first coupled-line, second coupled-line, third coupled-line and fourth coupled-line, each coupled-line composed of two metal lines.

The first port is connected with the front end of the first line of the first coupled-line, the fourth port is connected with the front end of the first line of the second coupled-line, the third port is connected with the front end of the second line of the first coupled-line, and the second port is connected with the front end of the second line of the second coupled-line. The back end of the first line of the first coupled-line is connected with the back end of the first line of the second coupled-line.

Moreover, the front end of the first line of the third coupled-line is short circuited with the front end of the second line of the third coupled-line, the back end of the first line of the third coupled-line is connected with the back end of the second line of the second coupled-line, and the back end of the second line of the third coupled-line is connected with the back end of the second line of the first coupled-line.

Finally, the front end of the first line of the fourth coupled-line is short circuited with the front end of the second line of the fourth coupled-line, the back end of the first line of the fourth coupled-line is open circuited, and the back end of the second line of the fourth coupled-line is connected with the back end of the first line of the first coupled-line and the back end of the first line of the second coupled-line.

Optionally, the third coupled-line may be arranged to be perpendicular to the first coupled-line and the second coupled-line.

Optionally, the fourth coupled-line may be arranged to be perpendicular to the first coupled-line and the second coupled-line.

Optionally, the coupled-line rat-race coupler may be installed on the top layer of a single-layer circuit board, and the bottom layer of the single-layer circuit board is a metal ground.

Optionally, the coupled-line rat-race coupler is arranged on a preset dielectric substrate, and the lower surface of the preset dielectric substrate is covered with metal to form a metal ground.

In operation, when the first port is the input port, the fourth port is the output through port, the third port is the output coupling port, and the second port is the isolation port; on the other hand, when the second port is the input port, the third port is the output through port, the fourth port is the output coupling port, and the first port is the isolation port.

Optionally, the four ports are all connected with SMA (SubMiniature version A) connectors.

In designing and sizing the coupled-line rat-race coupler, the distance between each port and the coupled-line the port is connected with, the length of each coupled-line, the width of each coupled-line, and the gap width between the first line and the second line of each coupled-line may be determined according to the performance indicators of the rat-race coupler. The performance indicators may be the operating frequency or the coupling coefficient of the coupled-line rat-race coupler.

With the circuit structure design of the coupled-line rat-race coupler according to the invention, the output phase at the third port and the output phase at the fourth port change by the same extent when the working frequency deviates from the center frequency, thus the output phase difference of the third port and the fourth port is relatively stable, and the stability of the output phase of the rat-race coupler is improved.

BRIEF DESCRIPTION OF THE DRAWINGS

The following drawings are provided to more clearly illustrate the embodiments of and the technical solutions provided by the invention. It is obvious that the drawings in the following only describe some embodiments of the invention. For ordinary technicians in the art, other embodiments may also be obtained from these drawings.

DESCRIPTION OF THE PREFERRED EMBODIMENT

The preferred embodiments of the rat-race coupler and the technical features of the present invention will be described clearly and completely in combination with the accompanying drawings. Obviously, the embodiments described here are only some, but not all, of the embodiments of the present invention. Based on the embodiments in the invention, all other embodiments that may be obtained by ordinary technicians in the art without additional creative work belong in the protection scope of the invention.

When the working frequency of the existing rat-race coupler deviates from the center frequency, the electrical length of the microstrip lines between the ports in the circuit structure of the rat-race coupler will change, resulting in the change of the output phase of the rat-race coupler, thereby affecting the stability of the output phase of the rat-race coupler. In order to solve the problem, the present invention provides a coupled-line rat-race coupler with smooth in-phase and out-of-phase characteristics.

Figure 1:
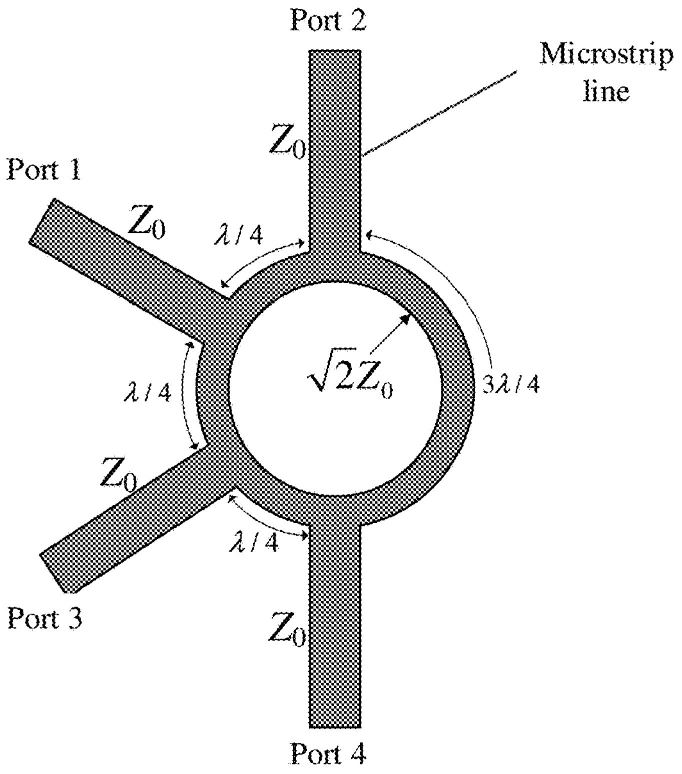
FIG. 1 PRIOR ART
FIG. 1 shows the structure of the existing traditional rat-race coupler circuit.
Figure 2:
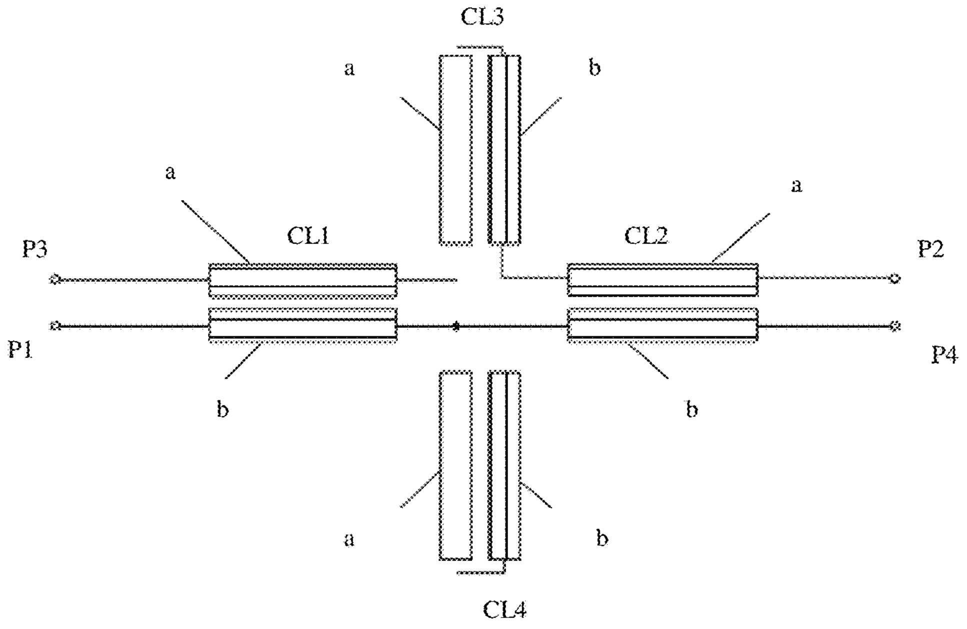
FIG. 2 is the circuit structure of a coupled-line rat-race coupler according to an embodiment of the present invention.

As illustrated by the circuit structure in FIG. 2, the rat-race coupler according to the present invention includes four ports (P1, P2, P3 and P4), and four coupled-lines (CL1, CL2, CL3 and CL4), each coupled line composed of two metal lines, respectively first line b and second line a.

As illustrated in FIG. 2, the first port P1 is connected with the front (i.e outer) end of the first line b of the first coupled-line CL1; the fourth port P4 is connected with the front end of the first line b of the second coupled-line CL2; the third port P3 is connected with the front end of the second line a of the first coupled-line CL1; and the second port P2 is connected with the front end of the second line a of the second coupled-line CL2. The back (i.e. inner) end of the first line b of the first coupled-line CL1 is connected with the back end of the first line b of the second coupled-line CL2.

Moreover, within the third coupled-line CL3, the front end of the first line b is short circuited with the front end of the second line a; the back (i.e. inner) end of the first line b of the third coupled-line CL3 is connected with the back end of the second line a of the second coupled-line CL2; and the back end of the second line a of the third coupled-line CL3 is connected with the back end of the second line a of the first coupled-line CL1.

Finally, within the fourth coupled-line CL4, the front end of the first line b is short circuited with the front end of the second line a; the back end of the first line b of the fourth coupled-line CL4 is open circuited, and the back end of the second line a of the fourth coupled-line CL4 is connected with the back end of the first line b of the first coupled-line CL1 and the back end of the first line b of the second coupled-line CL2.

The embodiment of the invention provides a coupled-line rat-race coupler with smooth in-phase and out-of-phase performances. With the circuit structure design of the rat-race coupler of the invention, as illustrated in FIG. 2 and described above, the output phase of the third port P3 will change to the same extent as will the output phase of the fourth port P4 when the working frequency of the rat-race coupler deviates from the center frequency, therefore the difference in the output phase between the third port P3 and the fourth port P4 will be relatively stable, and the stability of the output phase of the rat-race coupler will be improved.

In the embodiment of the invention, the four ports of the rat-race coupler are connected by the four coupled-lines, wherein each of the coupled-lines is composed of two metal lines (a and b), the length of the two metal lines may be the same or different, and a gap is formed between the two metal lines of each coupled-line. The specific lengths of the metal lines and the width of the gap between the metal lines may be set for each coupled-line by those skilled in the art according to requirements.

Figure 3:
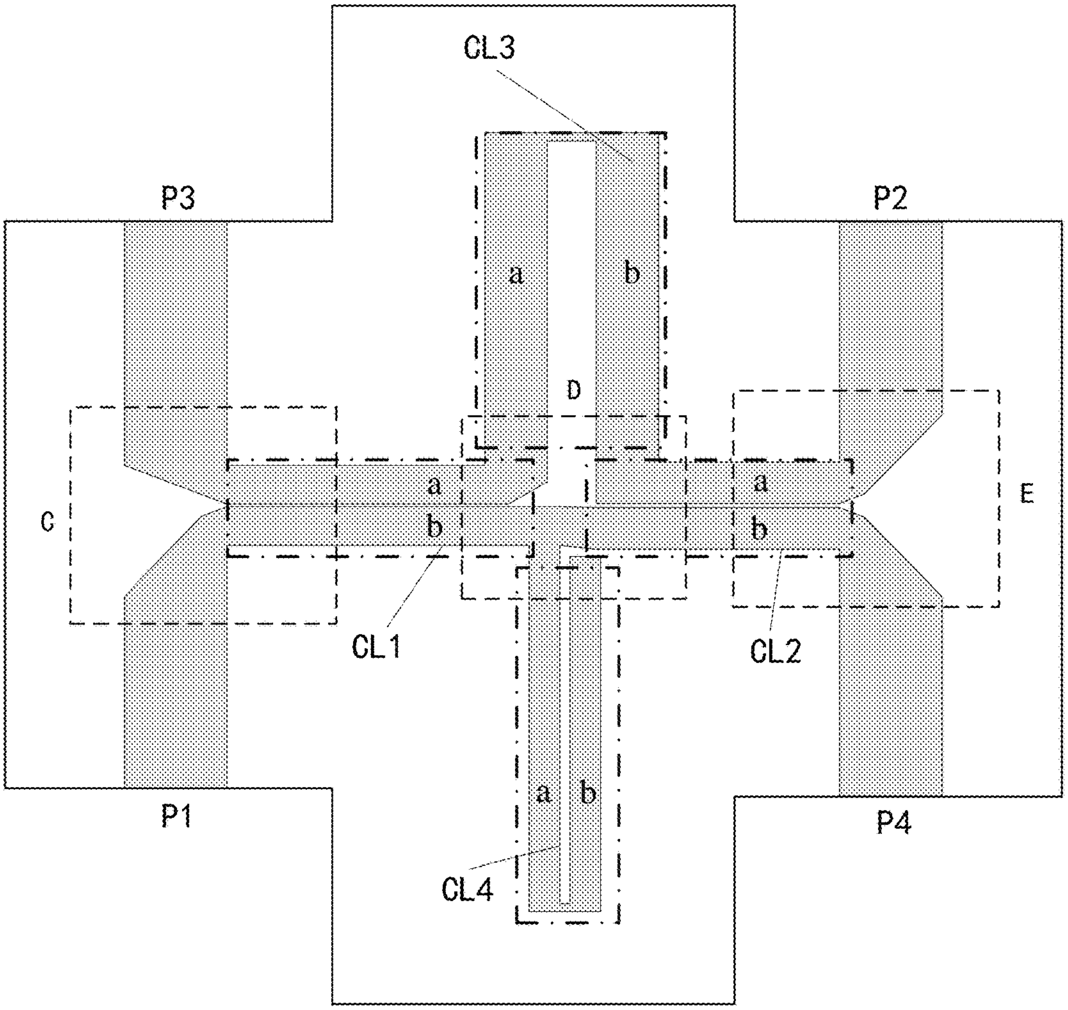
FIG. 3 is a schematic diagram of the overall circuit structure of the rat-race coupler according to the embodiment of the present invention shown in FIG. 2.

For example, as shown in FIG. 3, the first line of each coupled-line is represented by the line b, and the second line of each coupled-line is represented by the line a. Then, the connection between each port and each coupled-line may be as follows: the first port P1 is connected with the left (i.e. front) end of the first line b of the first coupled-line CL1; the right (i.e. back) end of the first line b of the first coupled-line CL1 is connected with the left (i.e. back) end of the first line b of the second coupled-line CL2; and the right (i.e. front) end of the first line b of the second coupled-line 2 is connected with the fourth port P4. The upper (i.e. back) end of the second line a of the fourth coupled-line CL4 is connected with the right end of the first line b of the first coupled-line CL1 and the left end of the first line b of the second coupled-line CL2; the lower (i.e. front) end of the second line a of the fourth coupled-line CL4 is short circuited with the lower (i.e. front) end of the first line b of the fourth coupled-line CL4; and the upper (i.e. back) end of the first line b of the fourth coupled-line CL4 is open circuited. The third port P3 is connected with the left end of the second line a of the first coupled-line CL1; the right end of the second line a of the first coupled-line CL1 is connected with the lower end of the second line a of the third coupled-line CL3; the upper end of the second line a of the third coupled-line CL3 is short circuited with the upper end of the first line b of the third coupled-line CL3; the lower end of the first line b of the third coupled-line CL3 is connected with the left end of the second line a of the coupled-line CL2; and the right end of the second line a of the second coupled-line CL2 is connected with the second port P2. In FIG. 3, the dotted box C represents the local connection of the first port P1, the third port P3 and the first coupled-line CL1; the dotted Box D represents the local connection of the first coupled-line CL1, the second coupled-line CL2, the third coupled-line CL3 and the fourth coupled-line CL4; and the dotted box E represents the local connection of the second port P2, the fourth port P4 and the second coupled-line CL2.

In the embodiment of the invention, the even mode and odd mode impedances of the first coupled-line CL1 can be expressed as ze1 and zo1, respectively, and the electric length of the first coupled-line CL1 can be expressed as θ1. In general, the even mode and odd mode impedances of the coupled-lines CLi, where i=1, 2, 3 or 4, can be expressed as $Z_{ei}$ and $Z_{oi}$, respectively, and the electric length of the coupled-line CLi can be expressed as $\theta_i$. The values of the parameters vary with the operating frequency and coupling coefficient of the rat-race coupler.

Alternatively speaking, the third coupled-line CL3 is connected in series between the second line a of the first coupled-line CL1 connected with the third port P3 and the second line a of the second coupled-line CL2 connected with the second port P2; the upper end of the second line a of the third coupled-line CL3 is short circuited with the upper end of the first line b of the third coupled-line CL3; and the third coupled-line CL3 is arranged to be perpendicular with the first coupled-line CL1 and the second coupled-line CL2. The rat-race coupler of this embodiment can realize output phase inversion when the first port P1 is used as input and output phase synchronization when the second port P2 is used as input.

Alternatively speaking, the fourth coupled-line CL4 is connected in parallel between the first line b of the first coupled-line CL1 connected with the first port P1 and the first line b of the second coupled-line CL2 connected with the fourth port P4; the lower end of the second line a of the fourth coupled-line CL4 is short circuited with the lower end of the first line b of the fourth coupled-line CL4; the upper end of the first line b of the fourth coupled-line CL4 is open circuited; and the fourth coupled-line CL4 is arranged to be perpendicular with the first coupled-line CL1 and the second coupled-line CL2. The rat-race coupler of this embodiment can make the output phase smoother.

In an application of the embodiment of the present invention, the rat-race coupler may be installed on the top layer of a single-layer circuit board, and the bottom layer of the single-layer circuit board may be set as a metal ground. For example, the rat-race coupler may be welded on the single-layer circuit board.

Optionally, the rat-race coupler can be arranged on a preset dielectric substrate, and the lower surface of the preset dielectric substrate can be covered with metal to form a metal ground. For example, the single-layer circuit board mentioned above can be a preset dielectric substrate, and the preset dielectric substrate can be: Rogers high frequency circuit board, Neltec high frequency circuit board, Taconic high frequency circuit board, Arlon high frequency circuit board, or FR4 epoxy resin circuit board, or F4B polytetrafluoroethylene glass cloth board, etc.

Optionally, the in-phase and out-of-phase characteristics of the rat-race coupler output signal can be realized by properly selecting the input port. Specifically, when the first port P1 is used as an input port, the fourth port P4 can be an output through port, the third port P3 can be an output coupling port, and the second port P2 can be an isolated port. When the second port P2 is used as input port, the third port P3 can be an output through port, the fourth port 4 can be an output coupling port, and the first port P1 can be an isolated port.

Optionally, the connector of each of the four can be an SMA (SubMiniature version A) connector.

In actual practice of the embodiment of the invention, the working frequency of the rat-race coupler can be 3.1 GHz-4 GHz as an example. Within the working frequency range, the output phase difference of the rat-race coupler can be changed smoothly and stably. For example, when the operating frequency of the rat-race coupler is in the range of 3.1 GHz-4 GHz, the in-phase output phase difference of the rat-race coupler is from −5° to 5°. The phase difference of the out-of-phase output is 180°±5°. When the operating frequency is within the range of 3.5 GHz±0.2 GHz, the fluctuation of in-phase output phase difference and out-of-phase output phase difference is less than 2°. When the second port P2 is used as the input port, the operating frequency of the rat-race coupler is close to the center frequency (3.5 GHz), and the output phase of the third port P3 and the fourth port P4 is about 0 degree. When the working frequency increases, the output phases of the third port P3 and the fourth port P4 will increase. On the other hand, when the working frequency decreases, the output phases of the port 3 and the port 4 will decrease. When the working frequency is near the center frequency, the absolute value of the output phase changes of the third port P3 and the fourth port P4 are proportional to the change in the working frequency.

In sizing and manufacturing the embodiment of the invention, the distance between each port and its corresponding coupled-line, the length of each coupled-line, the width of each coupled-line, and the gap width between the first line and the second line of each coupled-line can be determined according to the performance indicators of the rat-race coupler. The performance indicators of the rat-race coupler include: the operating frequency and the coupling coefficient of rat-race coupler. For example, those skilled in the art may design the size of the dielectric substrate and the metal ground according to the working frequency and the coupling coefficient of the rat-race coupler, and then determine the distance between each port and the corresponding coupled-line, the length of each coupled-line, and the width of each coupled-line, and the gap width between the first the line and the second line of each coupled-line. The width of each port of the rat-race coupler can also be designed according to the material of the dielectric substrate.

The embodiment of the invention as described above provides a coupled-line rat-race coupler with smooth in-phase and out-of-phase performances. The interconnection among the four ports and the four coupled-lines are described above in detail and illustrated in FIGS. 2 and 3. With the circuit structure design of the rat-race coupler in the invention, the output phase of the third port P3 will change to the same extent as will the output phase of the fourth port P4 when the working frequency of the rat-race coupler deviates from the center frequency, therefore the difference in output phase between the third port P3 and the fourth port P4 is relatively stable, and the stability of the output phase of the rat-race coupler is improved.

Figure 4:
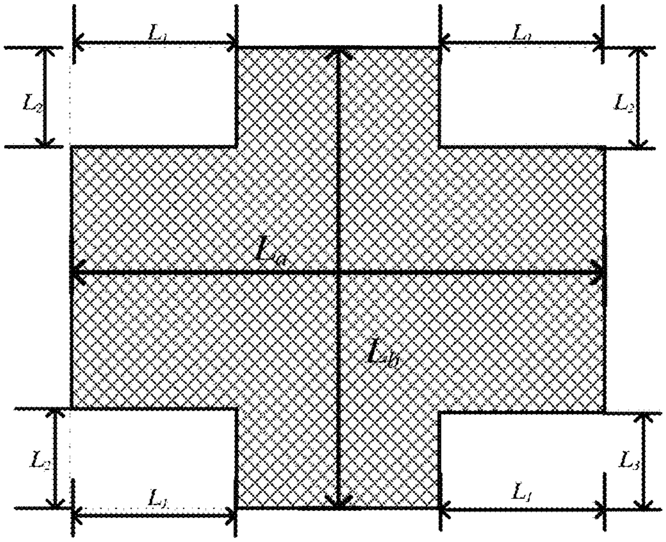
FIG. 4 is a schematic diagram of the structural dimensions of a dielectric substrate and a metal ground for the rat-race coupler according to the embodiment of the present invention.

In an embodiment of the invention, the working frequency of the rat-race coupler is 3.1 GHz-4 GHz, the center frequency is 3.5 GHz, the coupling coefficient is 2.1 dB, the dielectric substrate is Rogers high frequency circuit board, and the characteristic impedance of the four ports of the rat-race coupler is 50 ohm, the distance between each port and the corresponding coupled-line is designed as follows:

FIG. 4 is a schematic diagram of the structural dimensions of a dielectric substrate and a metal ground according to the embodiment of the present invention. The dielectric constant of the dielectric substrate Rogers high frequency circuit board is 3.48, the thickness is 1.524 mm, and the dielectric loss is 0.0037. The transverse width $L_a$ of the dielectric substrate is 38.075 mm and the longitudinal width $L_b$ is 36 mm. Four corners of the dielectric substrate are excavated. The excavated portions at the upper left, lower left and upper right corners each have an transverse excavation depth $L_1$=11.8 mm and a longitudinal excavation depth $L_2$=7.775 mm. The excavated portion at the lower right corner has an transverse excavation depth $L_1$=11.8 mm and a longitudinal excavation depth $L_3$=7.475 mm. The plane size of the metal floor is the same as that of the dielectric substrate.

Figure 5:
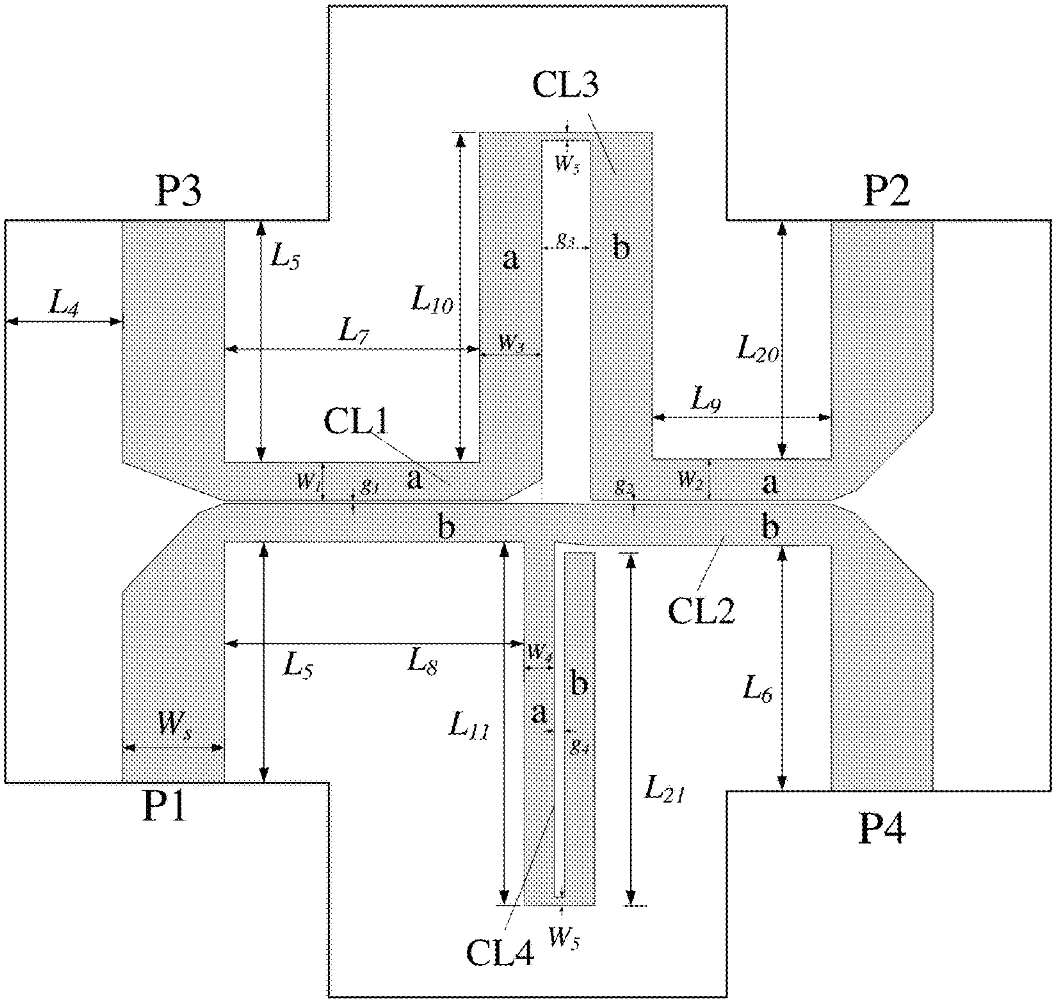
FIG. 5 is a schematic diagram of the overall circuit of the rat-race coupler according to the embodiment of the present invention.

FIG. 5 is a schematic diagram of the overall circuit size of a rat-race coupler according to the embodiment of the present invention. The width of each of the ports is expressed as $W_S$, which is set to 3.70 mm. The distance from the left edge of the first port P1 and the third port P3 to the left edge of the dielectric substrate is $L_4$=4.3 mm. Similarly, the distance from the right edge of the second port P2 and the fourth port P to the right edge of the dielectric substrate is also $L_4$=4.3 mm. The distance from the first port P1 to the first line b of the first coupled-line CL1 is $L_5$=8.775 mm, and the distance from the third port P3 to the second line a of the first coupled-line CL1 is also $L_5$=8.775 mm. The distance from the second port P2 to the second line a of the second coupled-line CL2 is $L_{20}$=8.625 mm, and the distance from the fourth port P4 to the first line b of the second coupled-line CL2 is $L_6$=8.925 mm. The first port P1 and the third port P3 respectively feed into the transversely arranged first coupled-line CL1 through a respective longitudinal microstrip line with a width of $W_S$=3.70 mm, and the second port P2 and the fourth port P4 respectively feed into the transversely arranged second coupled-line CL2 through a respective longitudinal microstrip line with a width of $W_S$=3.70 mm. The width of the first line b and the second line a of the first coupled-line CL1 is each $W_1$=1.4 mm, the gap width between the first line b and the second line a of the first coupled-line CL1 is $g_1$=0.1 mm, the width of the first line b and the second line a of the second coupled-line CL2 is each $W_2$=1.5 mm, and the gap width between the first line b and the second line a of the second coupled-line CL2 is $g_2$=0.2 mm.

As further shown in FIG. 5, the distance between the right edge of the first port P1 and the left edge of the second line a of the fourth coupled-line CL4 is $L_8$=10.9 mm, the distance between the right edge of the third port P3 and the left edge of the second line a of the third coupled-line CL3 is $L_7$=9.3 mm, and the distance between the left edge of the second port P2 and the right edge of the first line b of the third coupled-line CL3 is $L_9$=6.525 mm. The third coupled-line CL3 is positioned to be perpendicular to the first coupled-line CL1 and the second coupled-line CL2. The distance between the edge of the second line a of the first coupled-line CL1 and the upper end of the third coupled-line CL3 is $L_{10}$=12 mm. The line width of the first line b and the second line a of the third coupled-line CL3 is each $W_3$=2.25 mm. The gap width between the first line b and the second line a of the third coupled-line CL3 is $g_3$=1.75 mm. The upper ends of the first line b and the second line a of the third coupled-line CL3 are connected by a line with a width of $W_5$=0.3 mm. The fourth coupled-line CL4 is positioned to be perpendicular to the first coupled-line CL1 and the second coupled-line CL2. The distance between the lower edge of the first line b of the first coupled-line CL1 and the lower end of the fourth coupled-line CL4 is $L_{11}$=13.2 mm. The line width of the first line b and the second line a of the fourth coupled-line CL4 is each $W_4$=1.1 mm. The gap width between the first line b and the second line a of the fourth coupled-line CL4 is $g_4$=0.35 mm. The lower ends of the first line b and the second line a of the fourth coupled-line CL4 are connected by a line with a width of $W_5$=0.3 mm. The distance between the lower end of the fourth coupled-line CL4 and the upper end of the first line b of the fourth coupled-line CL4 is $L_{14}$=12.8 mm.

Figure 6:
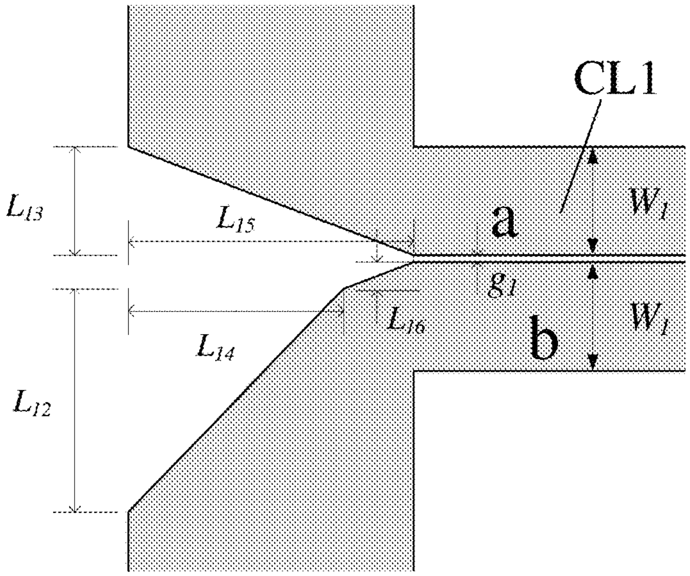
FIG. 6 is a schematic diagram of the corner where the first port and the third port of the rat-race coupler feed into the first coupled-line according to the embodiment of the present invention.

FIG. 6 is a schematic diagram of the corner where the first port P1 and the third port P3 feed into the first coupled-line CL1 of the rat-race coupler according to the embodiment of the present invention. A right triangle is cut off at the corner of the second line a where the third port P3 feeds into the first coupled-line CL1; and the right triangle has a longitudinal length $L_{13}$=1.4 mm and a transverse length $L_{15}$=3.7 mm. A right triangle and a right trapezoid are cut off at the corner of the first line b where the first port P1 feeds into the first coupled-line CL1. The right triangle has a longitudinal length $L_{12}$=2.87 mm and a transverse length $L_{14}$=2.78 mm; the right trapezoid has a height $L_{16}$=0.35 mm, an upper bottom length $L_{15}$=3.7 mm, and a lower bottom length $L_{14}$=2.78 mm.

Figure 7:
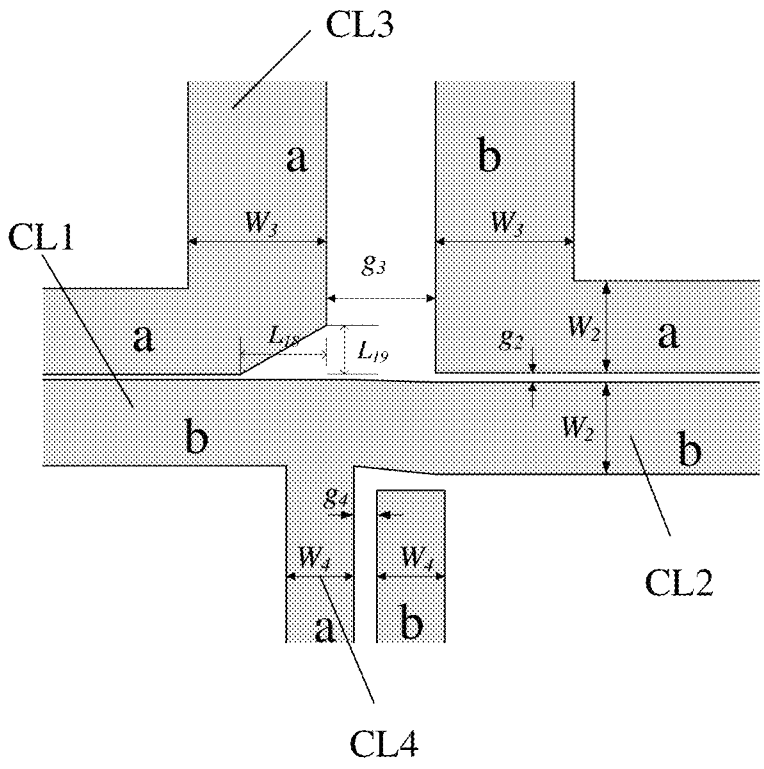
FIG. 7 is a schematic diagram of the joint of the four coupled-lines of the rat-race coupler according to the embodiment of the present invention.

FIG. 7 is the schematic diagram of the connection of the coupled-lines CL1, CL2, CL3 and CL4 of the rat-race coupler according to the embodiment of the present invention. A right triangle is cut off at the corner where the second line a of the first coupled-line CL1 and the second line a of the third coupled-line CL3 are connected. The right angle has a longitudinal length $L_{19}$=0.8 mm and a transverse length $L_{18}$=1.39 mm.

Figure 8:
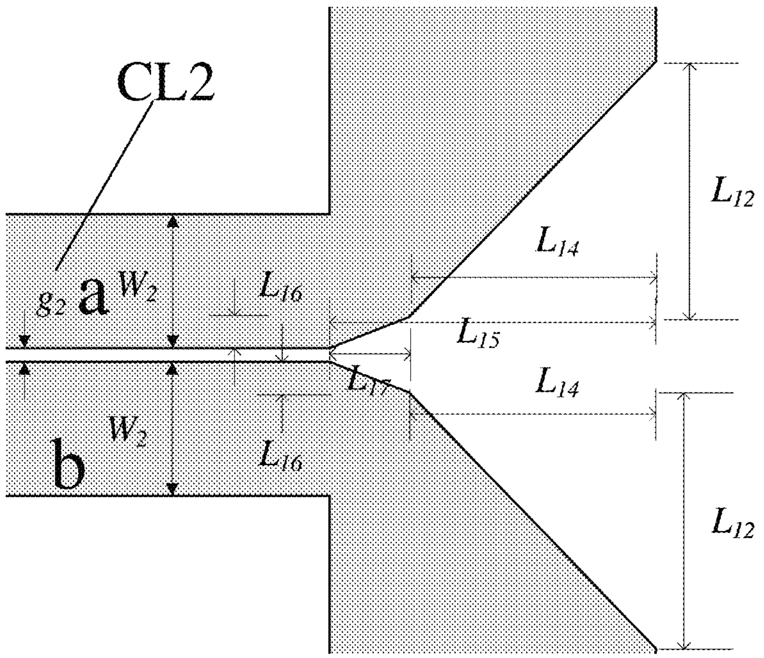
FIG. 8 is a schematic diagram of the corner where the second port and the fourth port of the rat-race coupler feed into the second coupled-line according to the embodiment of the present invention.

FIG. 8 is the schematic diagram of the corner where the second port P2 and the fourth port P4 feed into the second coupled-line CL2 of the rat-race coupler according to the embodiment of the present invention. A right triangle and a right trapezoid are cut off at the corner of the second line a where the second port P2 feeds into the second coupled-line CL2. The right triangle has a longitudinal length $L_{12}$=2.87 mm and a transverse length $L_{14}$=2.78 mm; the right trapezoid has a height $L_{16}$=0.35 mm, an upper bottom length $L_{15}$=3.7 mm, and a lower bottom length $L_{14}$=2.78 mm. Similarly, a right triangle and a right trapezoid are cut off at the corner where the fourth port P4 feeds into the first line b of the second coupled-line CL2. The right triangle has a longitudinal length $L_{12}$=2.87 mm and a transverse length $L_{14}$=2.78 mm; the right trapezoid has a height $L_{16}$=0.35 mm, an upper bottom length $L_{15}$=3.7 mm, and a lower bottom length $L_{14}$=2.78 mm, where $L_{17}=L_{15}-L_{14}$.

The operation of the above rat-race coupler designed with the working frequency of 3.1 GHz-4 GHz and the center frequency of 3.5 GHz is run by simulation, and the simulation results are as follows.

Figure 9:
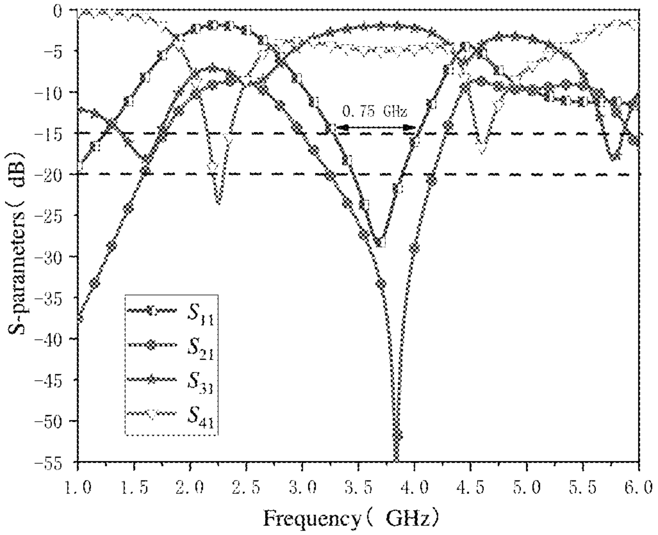
FIG. 9 is a schematic diagram of the simulation results of scattering parameters of the rat-race coupler when the first port is excited in the embodiment of the invention.

When the first port P1 is excited, the simulation results of scattering parameters of the rat-race coupler are shown in FIG. 9. The scattering parameters include return loss, isolation coefficient, coupling transmission coefficient and through transmission coefficient. Under the operating frequency of 3.5 GHz, the return loss of the rat-race coupler at the first port P1 ($S_{11}$) is −21.68 dB, and when the operating frequency is in the range from 3.28 GHz to 4.03 GHz, the return loss $S_{11}$ is less than −15 dB. At the operating frequency of 3.5 GHz, the output transmission coefficient (isolation coefficient) at the second port P2 ($S_{21}$) is −25.95 dB, and when the operating frequency is in the range from 3.28 GHz to 4.03 GHz, the isolation coefficient $S_{21}$ is less than −20 dB. At the operating frequency of 3.5 GHz, the coupling transmission coefficient from the first port P1 to the third port P3 ($S_{31}$, namely output transmission coefficient of the third port P3) and the through transmission coefficient (output transmission coefficient) from the first port P1 to the fourth port P4 ($S_{41}$) are −2.13 dB and −4.84 dB, respectively. In practical application, when the coupling coefficient of rat-race coupler is about 2.13 dB and the isolation coefficient $S_{21}$ is less than −20 dB, the directivity and isolation performance of the rat-race coupler are better. It can be seen that in the embodiment of the invention, the directivity and isolation performance of the rat-race coupler are better.

Figure 10:
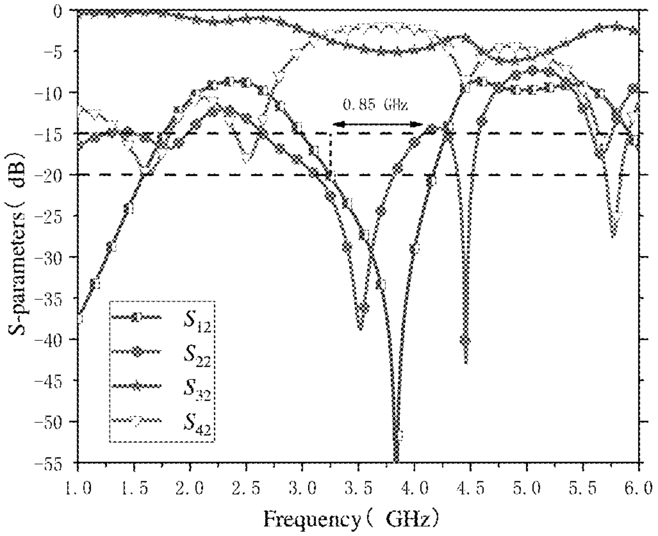
FIG. 10 is a schematic diagram of the simulation results of scattering parameters of the rat-race coupler when the second port is excited in the embodiment of the invention.

Alternatively, when the second port P2 is excited, the simulation results of scattering parameters of rat-race coupler are shown in FIG. 10. Under the operating frequency of 3.5 GHz, the return loss $S_{22}$ at the second port P2 of the rat-race coupler is −38.08 dB, and the return loss $S_{22}$ is less than −15 dB when the operating frequency is in the range from 2.65 GHz to 4.09 GHz. At the operating frequency of 3.5 GHz, the output transmission coefficient (isolation coefficient) at the first port P1 ($S_{12}$) is −25.95 dB, and the isolation coefficient $S_{12}$ is less than −20 dB when the operating frequency is in the range from 3.24 GHz to 4.17 GHz. The return loss $S_{22}$ is less than −15 dB, and the isolation coefficient $S_{12}$ is less than −20 dB when the operating frequency is in the range from 3.24 GHz to 4.09 GHz. At the operating frequency of 3.5 GHz, the through transmission coefficient from the second port P2 to the third port P3 ($S_{32}$, namely output transmission coefficient of the third port P3) is −4.63 dB, and the coupling transmission coefficient from the second port P2 to the fourth port P4 ($S_{42}$, namely output transmission coefficient of the fourth port P4) is −2.17 dB. In practical application, when the coupling coefficient of rat-race coupler is about 2.17 dB and the isolation coefficient $S_{12}$ is less than −20 dB, the directivity and isolation performance of the rat-race coupler are better. It can be seen that in the embodiment of the invention, the directivity and isolation performance of the rat-race coupler are better.

Figure 11:
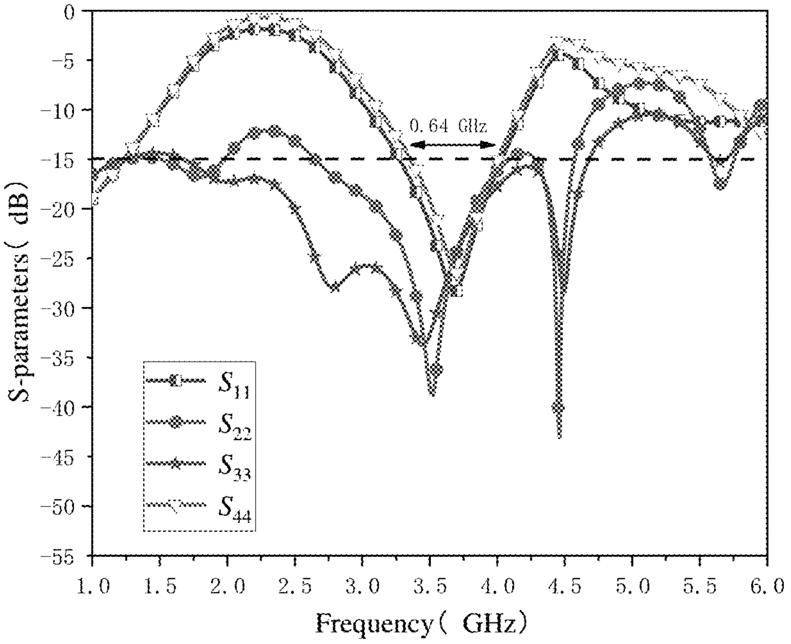
FIG. 11 is a schematic diagram of the simulation results of the scattering parameters when the four ports are excited respectively in the embodiment of the present invention.

The simulation results of scattering parameters when the four ports of the rat-race coupler are excited respectively are shown in FIG. 11. At the operating frequency of 3.5 GHz, the return losses $S_{11}$, $S_{22}$, $S_{33}$ and $S_{44}$ corresponding to the ports P1, P2, P3 and P4, respectively, are less than −17 dB. At the same time, the return losses $S_{11}$, $S_{22}$, $S_{33}$ and $S_{44}$ are less than −15 dB when the operating frequency of rat-race coupler is in the range from 3.36 GHz to 4 GHz. In practical application, the smaller the return loss, the better the impedance matching performance of each port of the rat-race coupler. It can be seen that in the embodiment of the invention, the impedance matching performance of each port of the rat-race coupler is better.

Figure 12:
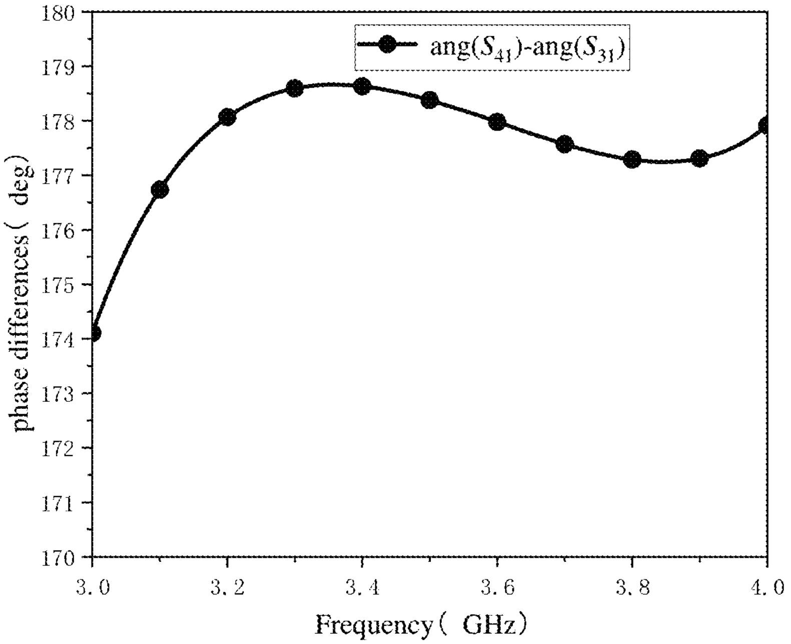
FIG. 12 is a schematic diagram of the simulation results of the output phase difference of the rat-race coupler when the first port is excited in the embodiment of the present invention.

FIG. 12 shows the simulation result of output phase difference of the rat-race coupler when the first port P1 is excited. When the operating frequency is 3.5 GHz, the output phase difference between the third port P3 and the fourth port P4 is 178.38°. When the operating frequency is in the range from 3.05 GHz to 4 GHz, the output phase difference between the third port P3 and the fourth port P4 is between 175° and 180°. When the operating frequency is in the range from 3.3 GHz to 3.7 GHz, the output phase difference between the third port P3 and the fourth port P4 is between 177° and 179°. It can be seen that in the embodiment of the invention, when the first port P1 is input, the output phase difference between the third port P3 and the fourth port P4 is approximately out of phase, and the fluctuation in the working frequency band is very small.

Figure 13:
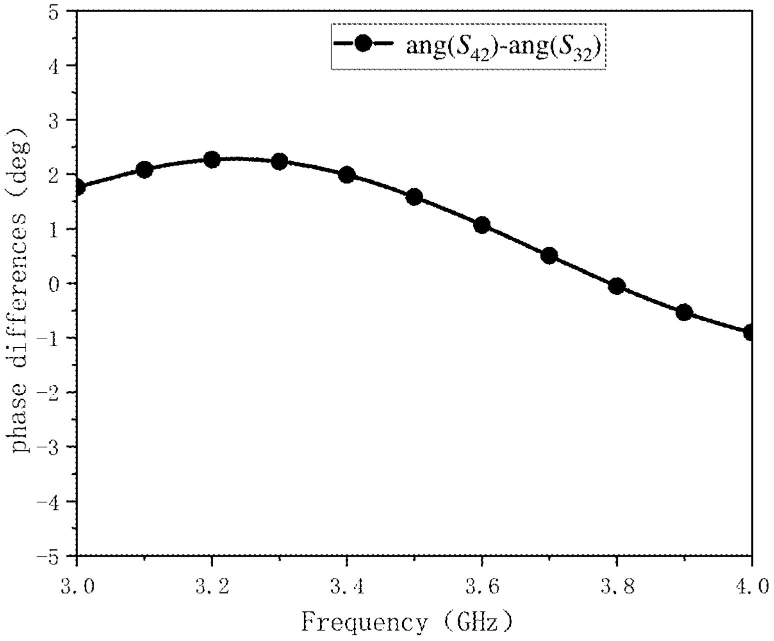
FIG. 13 is a schematic diagram of the simulation results of the output phase difference of the rat-race coupler when the second port is excited in the embodiment of the present invention.

FIG. 13 shows the simulation result of output phase difference of the rat-race coupler when the second port P2 is excited. When the operating frequency is 3.5 GHz, the output phase difference between the third port P3 and the fourth port P4 is 1.58°. When the operating frequency is in the range from 3 GHz to 4 GHz, the output phase difference between the third port P3 and the fourth port P4 is between −2° and 3°. When the operating frequency is in the range from 3.3 GHz to 3.7 GHz, the output phase difference between the third port P3 and the fourth port P4 is between 0.5° and 2.5°. It can be seen that in the embodiment of the invention, when the second port P2 is input, the output phase difference between the third port P3 and the fourth port P4 is approximately in-phase, and the fluctuation in the working frequency band is very small.

It should be noted that in the description above, relational terms such as first and second are only used to distinguish one entity or operation from another, and do not necessarily require or imply any such actual relationship or order between these entities or operations. Moreover, the terms "including" or any other variation are intended to cover nonexclusive inclusion, so that a process, method, article or device that includes a series of elements includes not only those elements, but also other elements that are not explicitly listed, or elements inherent in such process, method, article or device. Without further limitation, the element defined by the sentence "including a . . . " does not exclude the existence of other identical elements in the process, method, article or equipment including the element.

All the embodiments in this specification are described in related ways, and the same and similar parts among the embodiments can be referred to each other. Each embodiment focuses on the differences from other embodiments. The above description is only a preferred embodiment of the invention and is not intended to limit the protection scope of the invention. Any modification, equivalent replacement, improvement, etc. made within the spirit and principles of the invention are included in the protection scope of the invention.

We claim:

1. A coupled-line rat-race coupler with smooth in-phase and out-of-phase performances, the rat-race coupler comprising:

a first port, a second port, a third port and a fourth port; and a first coupled-line, a second coupled-line, a third coupled-line and a fourth coupled-line, each of the coupled-lines composed of a first line and a second line of metal;

wherein the first port is connected with a front end of the first line of the first coupled-line, the second port is connected with a front end of the second line of the second coupled-line, the third port is connected with a front end of the second line of the first coupled-line, and the fourth port is connected with a front end of the first line of the second coupled-line;

a back end of the first line of the first coupled-line is connected with a back end of the first line of the second coupled-line;

a front end of the first line of the third coupled-line is short circuited with a front end of the second line of the third coupled-line, a back end of the first line of the third coupled-line is connected with a back end of the second line of the second coupled-line, and a back end of the second line of the third coupled-line is connected with a back end of the second line of the first coupled-line; and a front end of the first line of the fourth coupled-line is short circuited with a front end of the second line of the fourth coupled-line, a back end of the first line of the fourth coupled-line is open circuited, and a back end of the second line of the fourth coupled-line is connected with the back end of the first line of the first coupled-line and the back end of the first line of the second coupled-line.

2. The coupled-line rat-race coupler as claimed in claim 1, wherein the third coupled-line is positioned to be perpendicular to the first coupled-line and the second coupled-line.

3. The coupled-line rat-race coupler as claimed in claim 1, wherein the fourth coupled-line is perpendicular to the first coupled-line and the second coupled-line.

4. The coupled-line rat-race coupler as claimed in claim 1, wherein the rat-race coupler is installed on a top layer of a single-layer circuit board, and a bottom layer of the single-layer circuit board is a metal ground.

5. The coupled-line rat-race coupler as claimed in claim 4, wherein the single-layer circuit board is a preset dielectric substrate, and a lower surface of the preset dielectric substrate is covered with metal to form the metal ground.

6. The coupled-line rat-race coupler as claimed in claim 1, wherein, when the first port is an input port, the fourth port is an output through port, the third port is an output coupling port, and the second port is an isolation port; when the second port is an input port, the third port is an output through port, the fourth port is an output coupling port, and the first port is an isolation port.

7. The coupled-line rat-race coupler as claimed in claim 1, wherein the first, second, third, and fourth ports are connected using SMA connectors.

8. The coupled-line rat-race coupler as claimed in claim 1, wherein dimensional parameters of the rat-race coupler are determined according to performance indicators of the rat-race coupler.

9. The coupled-line rat-race coupler as claimed in claim 8, wherein the dimensional parameters include a distance between each of the first-fourth ports and the corresponding first-fourth coupled-line the port is connected with, a length of each coupled-line, a width of each coupled-line, and a gap width between the first line and the second line of each of the first-fourth coupled-lines.

10. The coupled-line rat-race coupler as claimed in claim 8, wherein the performance indicators include an operating frequency and a coupling coefficient of the rat-race coupler.

* * * * *